Figure 1:
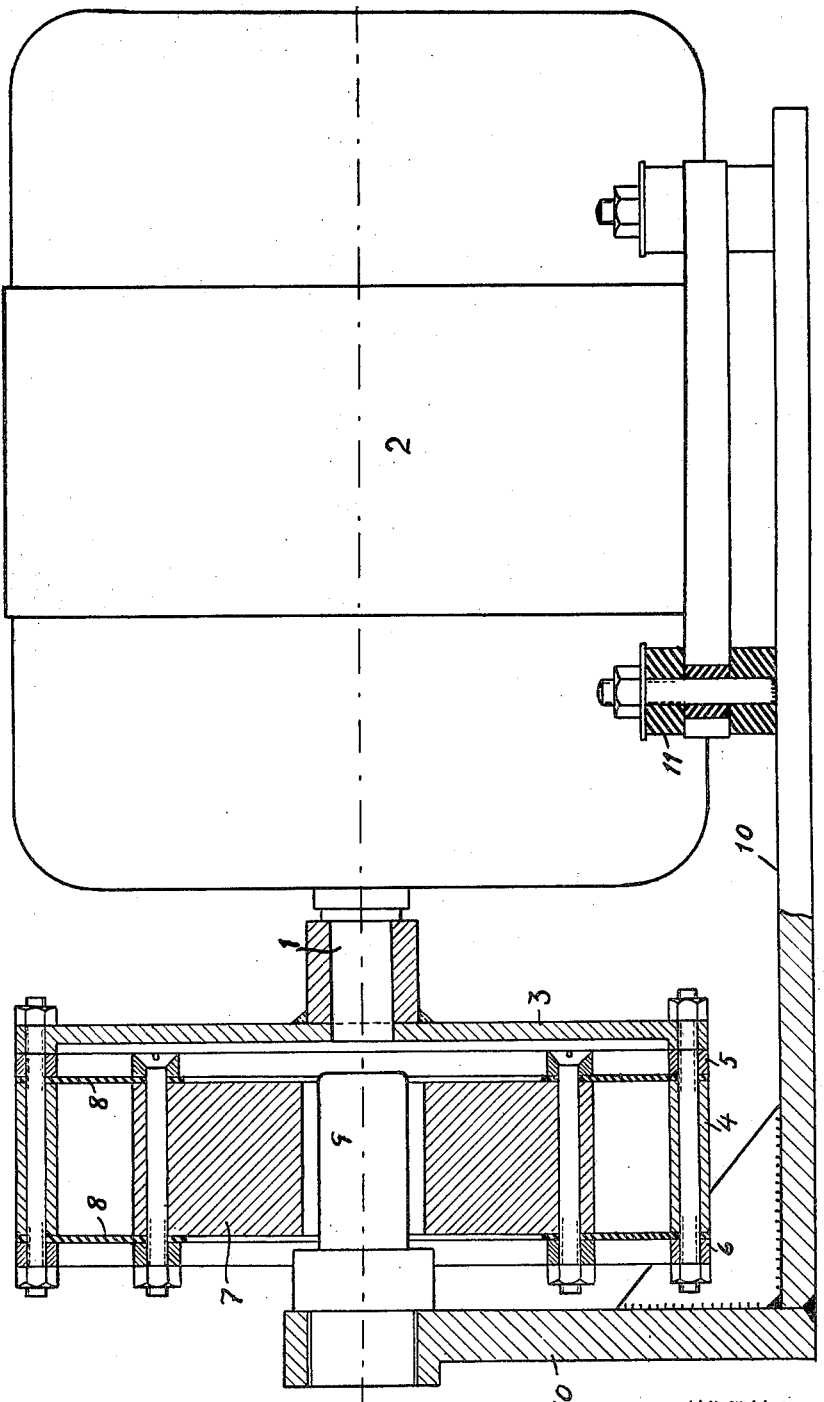

Jan. 9, 1951

C. G. V. SALLANDER 2,537,159

VIBRATOR

Filed April 1, 1947

3 Sheets-Sheet 1

INVENTOR
Court Gosta Valdemar Sallander
By Robert E Burns
ATTORNEY

Jan. 9, 1951 C. G. V. SALLANDER 2,537,159
VIBRATOR
Filed April 1, 1947 3 Sheets-Sheet 2
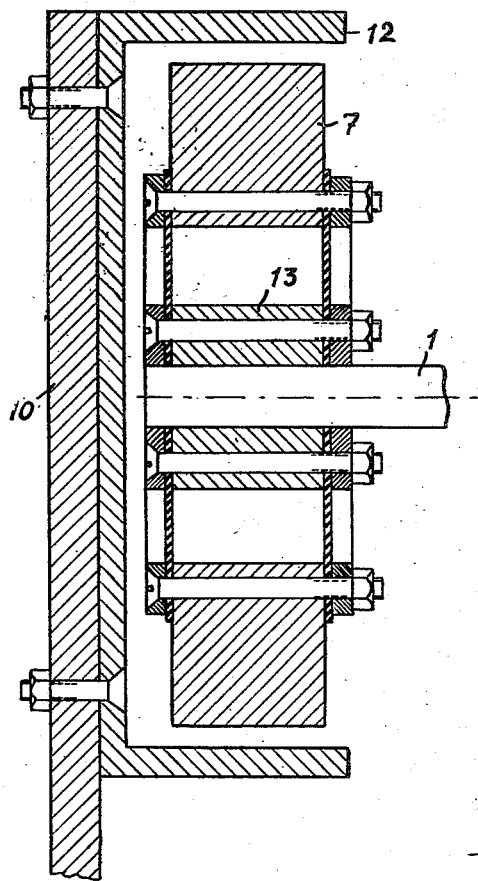
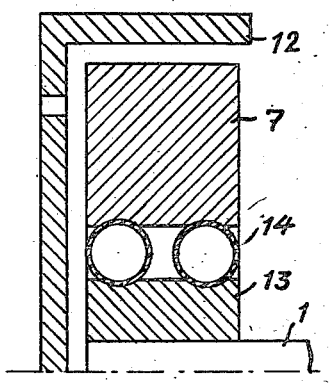
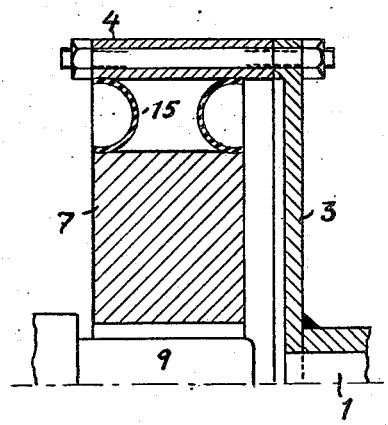
INVENTOR
Court Gosta Valdemar Sallander
By Robert E. Burns
ATTORNEY

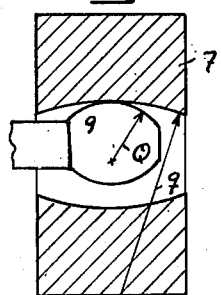
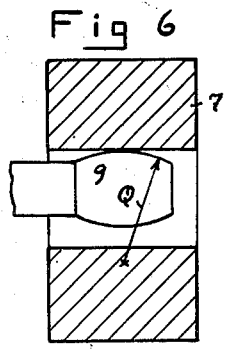
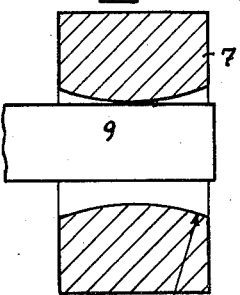
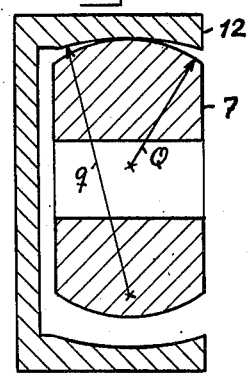
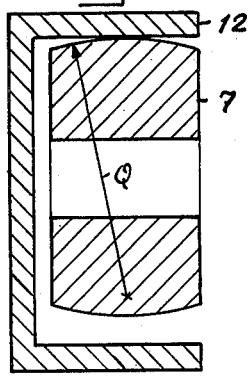
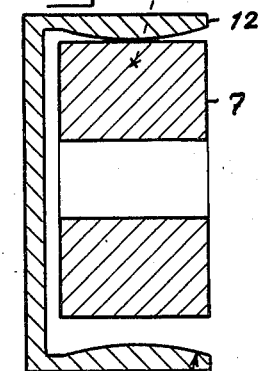
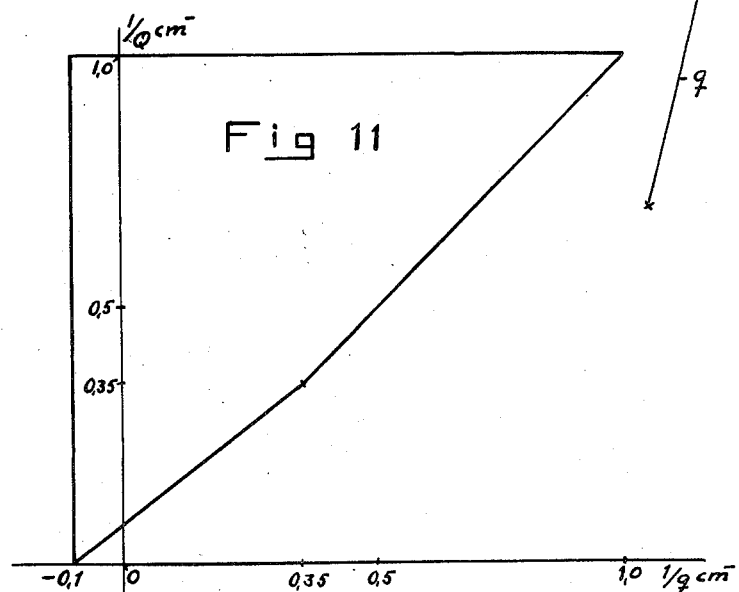

Patented Jan. 9, 1951

2,537,159

UNITED STATES PATENT OFFICE 2,537,159

VIBRATOR

Court Gösta Valdemar Sallander, Stockholm, Sweden

Application April 1, 1947, Serial No. 738,745
In Sweden April 15, 1946

9 Claims. (Cl. 259—1)

This invention relates to vibrating devices in which a rotary motion is transformed into vibratory movements, particularly such movements having a frequency higher than that of the rotary motion. Such vibrating devices are used for the vibration of solids, liquids or gases and are in particular used for placing concrete.

More particularly the invention relates to vibrators functioning according to the principles of planetary movement. In such vibrators the frequency of vibrations may be higher or less than the rotary motion.

The vibrator according to the invention comprises a vibratory member and a ring-shaped rotary member being elasticly connected to a driving shaft and having a circuit surface of revolution contacting with a circuit surface of revolution on said vibratory member, said members being arranged one inside the other and the rotary member being constructed to roll on the surface of said vibratory member while its axis is maintained in a single direction.

Thus the rotary member is performing a planetary rolling motion along the surface of revolution on the vibratory member. This planetary movement may, of course, be performed either inside a surrounding vibratory member, or the latter may be surrounded by the ring-shaped rolling rotary member.

For the purpose of increasing the stability of the rotary member I have also found it suitable to have the contacting surfaces of the rotary member and the vibratory member so formed that the former is rolling on the latter along a circuit path having very little width.

Other objects of the invention will be apparent from the following description and from the accompanying drawings which show, by way of examples, embodiments of the invention.

In the drawings:

Figs. 1 and 2 are sectional views of two different embodiments according to the invention, Figs. 3 and 4 are sectional views of two detailed constructions showing different forms of elastic connections, Figs. 5–10 are schematic views of different embodiments substantially showing different forms of contacting surfaces, and Fig. 11 is a view of a diagram.

Referring to Fig. 1, there is shown a driving shaft 1 of a motor 2. A carrier or cylindrical carrying member in which a rotary member 7 is suspended is positioned at the opposite end of the driving shaft 1 from the motor 2. This carrier consists of a disc 3 fixed to the driving shaft and supporting on one side at its periphery rings 4, 5 and 6 forming a cylinder secured to the disc by bolts or other suitable means. Interposed between these rings are positioned the outer edges of two ring-like elastic membranes 8, formed, for instance, of rubber. As shown in the drawing, the rotary member 7 consists of a heavy, homogeneous metal ring 7 which is suspended by the inner edges of the two membranes 8. The ring 7 is positioned about the end of a projecting tap 9 firmly attached to a support 10 such as threaded engagement therewith, said tap and support together forming a vibratory member which is intended to contact any desired object for the vibration thereof. The tap 9 has a diameter which is smaller than the inner diameter of the ring 7, and it is positioned axially of the driving shaft 1. The ring 7 is never exactly centered about the shaft 1 as it is suspended by the elastical material. Upon the starting of the driving motor 2 the rotatable ring 7 therefore is slung against the tap 9 by its own centrifugal force and thereafter will roll with a planetary movement thereon causing the vibration of the support 10. By maintaining a constant rate of revolution of the rotatable ring the frequency of the produced vibrations will be dependent on the relationship between the diameter of the tap and the inner diameter of the rotatable ring.

If a higher or lower frequency of vibration is desired, it is only necessary to unscrew the tap and replace it with a tap having a smaller or greater diameter. Such a substitution may also take place if the tap has become worn after having been used for some time. Even if the tap and the rotary ring are made of an equivalent material, preferably of a high hardened steel, the wear will be more pronounced upon the tap, which is an advantage as this part is cheaper and more easy to substitute.

The rubber membranes 8 which are to transfer the turning moment to the rotary ring 7 possess a springing action sufficiently high to let the rotary ring 7 roll on the tap 9, and simultaneously to guide the ring. The centrifugal and gyroscopic forces acting on the rotating ring will always maintain its axis in the same direction.

An embodiment as described above and illustrated in Fig. 1 may for instance have the following data: engine power 25/100 H. P., number of revolutions: 1425 R. P. M., centrifugal force: 300 kilograms, frequency: 3000 vibrations minutely. As mentioned above the frequency can be considerably changed in putting in a tap having another diameter. The increase in frequency is limited only by the strength of the material.

In Fig. 2 there is shown another embodiment of the vibrator according to the invention. Here the driving shaft 1 is provided with a ring 13 at the ends of which are positioned the elastic membranes holding the rotatable ring 7. At its outer periphery said ring is received within the end of a cylinder 12 attached to the support 10, the cylinder having a greater diameter than the outer diameter of the ring 7. Thus in its rotation, the ring 7 will roll on the inner envelope surface of the cylinder. The further operation of this embodiment will be practically the same as described with reference to Fig. 1. However there is a difference in that the number of bendings of the rubber membranes will be fewer in the first embodiment than in the latter. When the ring 7 is rotating around a firm tap, such as in the embodiment shown in Fig. 6, the number of the bendings will be equal to the difference between the vibration frequency and the number of revolutions, whereas the number of bendings of the membranes in the embodiment shown in Fig. 2 will be equal to the sum of the vibration frequency and number of revolutions. On the other hand, the wear will be a little more apparent in the first embodiment as the contact surface taking up the centrifugal force is considerably shorter on the tap having a small diameter as compared with the longer contact surface on the cylinder positioned about the rotatable ring. In any case the wear is relatively small and without any deciding importance.

In Fig. 3 there is shown an embodiment in accordance with which rubber hoses 14 are substituted for the membranes 8. These hoses are preferably filled with compressed air. Compact rubber rings are not preferred because of the great inner friction of the rubber such rings will be highly heated and rapidly destroyed. The use of thin-walled hoses is preferred because of their excellent springing action without the friction which causes the heating.

Instead of fastening the rubber membranes by means of the bolted constructions shown in Figs. 1 and 2 it is possible to attach them by vulcanizing, for example, in the manner shown in Fig. 4. The space between the membranes can also be filled with compressed air so that the rotary member is resting on an air puffer as in the case of hoses. Instead of rubber membranes or the like it is possible to use metal springs.

As shown in Fig. 1 the motor is mounted by means of shock absorbers, for example, rubber puffers 11, attached to the support 10 so that the puffers absorb the vibration. Thus the whole apparatus forms a compact unit which may be utilized by placing it upon the object to be vibrated. It is possible to make the puffers sufficiently effective so that the motor is scarcely exposed to the vibration.

As mentioned above the two contacting surfaces of the rotary member and the vibratory member preferably are formed to contact each other only along a path having a narrow width. This can be accomplished by making the radii of curvature of the two surfaces different. The surface of greater curvature may be of infinite radius providing a straight surface. In a preferred embodiment a section through the outer surface in the direction of the axis has a concave shape while the corresponding section through the inner surface has a convex shape, the section last mentioned thus having the shorter radius of curvature. Theoretically, viz. geometrically, there will always be a point of contact between such surfaces having different curvatures, but in actual practice the elasticity of the material generally causes the contact to be extended to form a contact spot of elliptical shape and, by rolling, such surfaces will contact each other along a narrow path.

In Figs. 5–10 there are shown different forms of said surfaces. Thus, Figs. 5–7 show schematically rotary members positioned about vibratory members, while Figs. 8–10 show schematically corresponding forms in constructions in which the rotary members are surrounded by the vibratory members. In all of the Figs. 5–10 the rotary members and the vibratory members are designated by the same reference numerals as in the corresponding Figs. 1–4. The capital letter $Q$ indicates the radius of curvature of the inner surface and the small letter $q$ indicates the radius of curvature of the outer surface.

With regard to the stability of the rotary member, it has been found by experiments combined with mathematic calculations that it is possible to predetermine the most suitable radii of curvature for a certain construction. Any general formula can not, however, be set out as the numerical values are dependent upon several factors such as the thickness and the diameter of the rotary member, the diameter of the path etc.

In the following examples the respective lengths of the radii of curvature are established for a vibrator in which the tap has a diameter of 2 cm. The enclosing rotatable ring 7 has an inner diameter of 2.7 cm., an outer diameter of 10 cm. and a width of 3 cm. The calculations are made on the basis of the presumptions 1. That the moments in the contact point between the rotary member and the path = 0, and
2. That the rotary member may not turn about a diameter through the contact point.

Thus it has been found that the inverted values of the radii of curvature, calculated in centimeters, can be inserted in a coordinate system in which $1/q$ is set off along the axis of abscissas, i. e. the X-axis, and $1/Q$ is set off along the axis of ordinates, i. e. the Y-axis (Fig. 11). The practical values of $1/q$ and $1/Q$ then are to be found within an area defined by lines obtained by connecting the points — 0.1 and 0, — 0.1 and 1.0, 1.0 and 1.0, 0.35 and 0.35. Thus the lines restricting this so-called "stability polygon" approximatively indicates the outer limits for said inverted values $1/q$ and $1/Q$ providing a good stability of the rotary member when the latter is rolling along its path. In other words, any point inside said polygon is defined by a value of $1/q$ (the X-value) and a value of $1/Q$ (the Y-value) and such inverted values represent useful radii of curvature of $q$ and $Q$ respectively. Points outside the polygon represent values of these quantities which are not so useful, i. e. the rotary member will not be stable. For instance $1/q$ may be = 0, $q$ is then equal to infinity, viz., the outer surface is generated by a straight line, see Figs. 6 and 9, and then $1/Q$ varies between about 0.08 and 1, viz., $Q$ varies between 12.5 and 1 cm. $1/q$ can also be negative down to —0.1 ($q$=—10 cm.) which means that the outer surface can have a convex form, as shown in Figs. 7 and 10. This latter possibility is, however, substantially of theoretical interest. In the preferred embodiments the radii of curvature of the two surfaces have positive values, as shown in Figs. 5 and 8.

The best stability of the rotary member is obtained at points as far as possible inside the limits of the polygon or approximately in its center, as for example about the point 0.28 and 0.65. The values of the radii here obtained will however be of essentially different size. If $1/q = 0.28$, then $q$ is about 3.5, while if $1/Q$ is 6.5, then $Q$ is about 9.5. In such a case the result will be a very small contact path between the two contacting surfaces and the unit surface pressure will be great. In practice, in order to obtain a surface pressure as low as possible, it has been found to be convenient to have only a little difference between the lengths of the radii of curvature, and simultaneously the inverted values of said radii may be located as far inside the limits of the polygon as to obtain a sufficient stability. Preferably, the values of $1/q$ and $1/Q$ are taken from the area between the center of the polygon and the lower part of the 45° line extending between the point 1.0 and 1.0 and the point 0.35 and 0.35. From the point of view of stability this line is the least critical one, but values of $1/q$ and $1/Q$ taken from its vicinity lead to constructions necessitating contact surfaces of high quality.

In experiments with members having the preferred radii of curvature a very good stability of the rotatable ring has been obtained. Units with these members have been found to return to balance after having had an accidental unbalance caused by other agencies.

Though the example above mentioned refers to a specific construction with set imensions it is to be expected that approximately similar conditions prevail in the case other dimensions are used.

With a vibrator according to this invention it is possible to produce vibrations of very high frequency. Other advantages are inherent in the vibrator. The vibrator itself is very simple and cheap to manufacture, and by reason of its construction utilizes few bearings thus eliminating sources of wear. The frequency can easily be changed by replacing a single member. In comparison with the relatively long pendulum vibrators, partially working according to the same principle as herein described, the vibrator in accordance with the invention has a short length, which sometimes is of great importance. As a power source an ordinary motor of standard type can be used whereas the majority of other vibrators require specially constructed motors. Further, as the motor in the preferred embodiment is resiliently connected to the vibratory member and in the other embodiments is not connected therewith it will not be exposed to additional strains, whereby its duration of life is extended.

I claim:

1. In a vibrator, a vibratory member having a surface of revolution, a ring-shaped rotary member having a surface of revolution with a radius different from the radius of said first-mentioned surface of revolution, a driving shaft, and elastic coupling means connecting said rotary member to said driving shaft and allowing radial displacements of said rotary member with respect to said driving shaft, said two members being arranged one inside the other and said rotary member being adapted to roll on said surface of said vibratory member on rotation of said driving shaft with its axis pointing constantly in the same direction.

2. In a vibrator, a vibratory member having a surface of revolution, a ring-shaped rotary member having a surface of revolution with a radius different from the radius of said first-mentioned surface of revolution, said members being arranged one inside the other, a driving shaft, a carrier member mounted on said driving shaft, and elastic coupling means connecting said carrier member and said rotary member and allowing radial displacements of said rotary member with respect to said carrier member, said carrier member being so formed and arranged with respect to said first-mentioned two members that said ring-shaped rotary member is positioned radially between said carrier member and said vibratory member, said rotary member being adapted to roll on said surface of revolution of the said vibratory member on rotation of said driving shaft with its axis pointing constantly in the same direction.

3. A vibrator according to claim 2, in which the elastic coupling means mounted between said carrier member and said rotary member is made of rubber and forms at least one air buffer.

4. In a vibrator, a vibratory member having a surface of revolution, a ring shaped rotary member having a surface of revolution with a radius different from the radius of said first-mentioned surface of revolution, a driving shaft, and elastic coupling means connecting said rotary member to said driving shaft and allowing radial displacements of said rotary member with respect to said driving shaft, said two members being arranged one inside the other and said rotary member being adapted to roll on said surface of said vibratory member on rotation of said driving shaft with its axis pointing constantly in the same direction, and said two surfaces of revolution being so shaped that said rotary member during said rolling motion contacts said vibratory member along a circular path of narrow width.

5. In a vibrator, a vibratory member having a surface of revolution, a ring-shaped rotary member having a surface of revolution with a radius different from the radius of said first-mentioned surface of revolution, a driving shaft, and elastic coupling means connecting said rotary member to said driving shaft and allowing radial displacements of said rotary member with respect to said driving shaft, said two members being arranged one inside the other and said rotary member being adapted to roll on said surface of said vibratory member on rotation of said driving shaft with its axis pointing constantly in the same direction, and said surfaces of revolution being so formed that the outer surface is concavely curved and the inner surface is convexly curved in axial cross-section, the radius of curvature in the first instance being greater than in the second instance.

6. In a vibrator, a vibratory member having a surface of revolution, a ring-shaped rotary member having a surface of revolution with a radius different from the radius of said first-mentioned surface of revolution, a driving shaft, and elastic coupling means connecting said rotary member to said driving shaft and allowing radial displacements of said rotary member with respect to said driving shaft, said two members being arranged one inside the other and said rotary member being adapted to roll on said surface of said vibratory member on rotation of said driving shaft with its axis pointing constantly in the same direction, and said two surfaces of revolution being so shaped that the outer surface forms a straight cylinder and the inner surface is convexly curved in axial cross-section.

7. In a vibrator, a vibratory member having a surface of revolution, a ring-shaped rotary member having a surface of revolution with a radius different from the radius of said first-mentioned surface of revolution, a driving shaft, and elastic coupling means connecting said rotary member to said driving shaft and allowing radial displacements of said rotary member with respect to said driving shaft, said two members being arranged one inside the other and said rotary member being adapted to roll on said surface of said vibratory member on rotation of said driving shaft with its axis pointing constantly in the same direction, and said two surfaces of revolution being so shaped that the outer surface is convexly curved in axial cross-section and the inner surface forms a straight cylinder.

8. In a vibrator, a vibratory member having a projection provided with a surface of revolution, a ring-shaped rotary member provided with an inner surface of revolution having a greater diameter than said first surface of revolution and surrounding and contacting said projection, a cylindrical carrier member arranged about said rotary member, a driving shaft arranged with its axis substantially through the axis of said projection, means for mounting said carrier member on said driving shaft, and elastic coupling means connecting said carrier member and said rotary member and allowing said rotary member to roll on said surface of revolution of said projection on rotation of said driving shaft, said rotary member being adapted to keep its axis pointing constantly in the same direction during said rolling motion.

9. In a vibrator, a vibratory member having a cylindrical part provided with an inner surface of revolution, a ring-shaped rotary member provided with an outer surface of revolution having a smaller diameter than said first-mentioned surface of revolution and surrounded by said cylindrical part, a driving shaft substantially coaxial with said cylindrical part, a carrier member mounted on said driving shaft and arranged within said ring-shaped rotary member, and elastic coupling means mounted between said carrier member and said rotary member allowing said rotary member to roll along the inner surface of said cylindrical part of said vibratory member on rotation of said driving shaft, said rotary member being adapted to keep its axis pointing constantly in the same direction during said rolling motion.

COURT GÖSTA VALDEMAR SALLANDER.

REFERENCES CITED

The following references are of record in the file of this patent:

UNITED STATES PATENTS

| Number | Name | Date |
|---|---|---|
| 1,517,587 | Roth | Dec. 2, 1924 |
| 2,422,639 | Wenander | June 17, 1947 |